(12) United States Patent
Steensgaard et al.

(10) Patent No.: US 6,681,385 B1
(45) Date of Patent: Jan. 20, 2004

(54) METHOD AND APPARATUS FOR DETERMINING THE RELATIONSHIPS AND USEFUL LIFETIME OF OBJECTS IN A PROGRAM

(75) Inventors: Bjarne Steensgaard, Redmond, WA (US); David Edward Gay, Berkeley, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/415,038

(22) Filed: Oct. 7, 1999

(51) Int. Cl.[7] .................................................. G06F 9/45
(52) U.S. Cl. ........................................ 717/133; 707/206
(58) Field of Search ............................ 717/133; 707/206

(56) References Cited

U.S. PATENT DOCUMENTS

| | | | | |
|---|---|---|---|---|
| 5,075,848 A | * | 12/1991 | Lai et al. .................... 711/152 |
| 5,274,804 A | * | 12/1993 | Jackson et al. ............. 707/206 |
| 5,321,834 A | * | 6/1994 | Weiser et al. ............... 707/206 |
| 5,392,432 A | * | 2/1995 | Engelstad et al. ....... 707/103 R |
| 5,423,041 A | * | 6/1995 | Burke et al. ................ 717/117 |
| 5,485,616 A | * | 1/1996 | Burke et al. ................ 717/133 |
| 5,535,390 A | * | 7/1996 | Hildebrandt ................ 709/312 |
| 5,560,003 A | * | 9/1996 | Nilsen et al. ............... 707/206 |
| 5,590,332 A | * | 12/1996 | Baker .......................... 707/206 |
| 5,790,861 A | * | 8/1998 | Rose et al. .................. 717/116 |
| 6,253,226 B1 | * | 6/2001 | Chidambaran et al. ..... 707/101 |
| 6,317,756 B1 | * | 11/2001 | Kolodner et al. ........... 707/205 |
| 6,317,816 B1 | * | 11/2001 | Loen ...................... 707/103 R |
| 6,327,606 B1 | * | 12/2001 | Chidambaran .............. 707/101 |
| 6,370,684 B1 | * | 4/2002 | De Pauw et al. ........... 717/105 |
| 6,381,738 B1 | * | 4/2002 | Choi et al. .................. 717/124 |
| 6,438,560 B1 | * | 8/2002 | Loen ...................... 707/103 R |

OTHER PUBLICATIONS

Blanchet, Escape Analysis: Correctness Proof . . . , Jan. 1998, ACM. p. 25–37.*
Benton et al., Compiling Standard ML to Java Bytecodes, Sep. 1998, ACM, p. 129–140.*
Grove et al., Call Graph Construction in Object Oriented Languages, Oct. 1997, ACM, p. 108–124.*
Burke et al., The Jalapeno Dynamic Optimizing Compiler for Java, Jun. !999, ACM, p. 129–141.*

* cited by examiner

Primary Examiner—John Chavis
(74) Attorney, Agent, or Firm—Lee & Hayes, PLLC (57) ABSTRACT

A method for determining object bounds for objects within a program comprises receiving the program code in a suitable language and analyzing the received code with a set of rules defining an escape analysis with a complexity linear in time and space with the size of the program plus the program's call graph.

42 Claims, 5 Drawing Sheets

METHOD AND APPARATUS FOR DETERMINING THE RELATIONSHIPS AND USEFUL LIFETIME OF OBJECTS IN A PROGRAM

TECHNICAL FIELD

This invention generally relates to software compilers and, in particular, to a method and apparatus for determining the relationships and useful lifetime of objects of a program using linear escape analysis.

BACKGROUND OF THE INVENTION

Legacy programming languages typically require a programmer to embed instructions within their code to manage memory resources to support the proper execution of the program. This manual management of memory resources is prone to error, the result of which is the all too familiar memory "overflow" and "out of memory" conditions leading to the premature conclusion of an executing program.

To alleviate this problem, more advanced programming languages have been developed including the Java™ language by Sun Microsystems, the Standard ML (SML) language of Bell Laboratories (now Lucent Technologies), and the well known LISP programming language, each of which include automatic memory management facilities. In these advanced object-oriented programming languages, memory for objects (software "bundles" of variables and related methods) is explicitly allocated by the program and implicitly reclaimed by the runtime environment (e.g., the Java™ Virtual Machine) when no longer needed.

When discussing the memory resources of a system, programmers often talk in terms of static memory, the stack and the heap. It is to be appreciated that these are merely separately identifiable segments of a common memory system, delineated by what they store and how they are managed. A stack, for example, is typically created in accordance with (and has the lifetime of) execution of a thread or a method (using the well-known object-oriented programming parlance). The heap is created at runtime and is available to and shared among all threads throughout execution of the program. Accordingly, a stack is useful for storing local variables and partial results used within a thread and or method, while the heap is required for program elements that traverse threads.

In the advanced object-oriented programming languages identified above, a compiler identifies threads, objects, methods and static and dynamic variables comprising the program and allocates memory resources to each based on the functional lifetime, or "bounds", of the element. However, because it is often difficult to determine the exact bounds of an object, especially if it is returned from multiple methods across threads, the convention is to treat all objects the same, i.e., allocating them on (and subsequently reclaiming from) the heap.

The process of implicitly reclaiming memory resources from the heap is colloquially referred to as "garbage collection" and is a function of the runtime environment for the language. A number of techniques for garbage collection exist, each having their own advantages and disadvantages. Common to all of the techniques, however, is that they all consume processor resources—resources that might otherwise be used in support of the executing program, rather than a function of the runtime environment. Thus, while the garbage collection feature simplifies the software development process by relieving the programmer of manual memory management, it comes at a price.

In addition to the automatic memory management features, advanced programming languages typically support the simultaneous execution and automatic synchronization of multiple threads. The synchronization feature of these languages requires the compiler to provide for allocation of memory resources for pointers, counters and the like to maintain the synchronization. To support object synchronization in Java, for example, every object is conceptually created with a lock that may be used to ensure that each method executes atomically by acquiring and releasing the lock. Accordingly, if another thread (which is to be synchronized with the present thread) has the lock, the present thread cannot acquire the lock and therefore must wait for the other thread to release it. Although the synchronization features of these advanced languages relieve the programmer from "manually" maintaining synchronization, this, too, comes at a price. As above, without knowing the bounds of an object, it is impossible to know whether synchronization is required. Consequently, as for memory management above, prior art compilers employ the conservative approach of assuming that all objects programmed to ensure atomic access by synchronization must perform all synchronization operations—an approach which is costly in terms of consumed memory and garbage collection overhead.

In an attempt to limit the overhead required to support heap allocation and object synchronization, researchers have worked to develop techniques that would enable a compiler to identify the bounds of objects of a program, thus alleviating the need for the assumptions leading to excessive heap allocation and synchronization support. One approach to identifying object bounds is commonly referred to as escape analysis. Escape analysis attempts to identify whether an object escapes from or is returned from a method or thread. A number of articles have been published describing the efficacy of escape analysis including, for example, *Escape Analysis. Correctness Proof, Implementation and Experimental Results*, by Bruno Blanchet and published in the Proceedings of Principles of Programming Languages (1998), the text of which is hereby incorporated by reference as background material on escape analysis. A common limitation among all of the prior art escape analyses, including the Blanchet analysis, is that the complexity of the analysis increases super-linearly with the size of the program. Specifically, the complexity bound of the Blanchet analysis is mathematically represented as $O(n \log^2 n)$. The Blanchet analysis algorithm is moderately difficult to understand and implement. Other prior art escape analysis algorithms have a higher worst-case complexity. Thus, for very large programs, incorporating a prior art escape analysis technique into a compiler would increase the compile time super-linearly with the size of the program.

Accordingly, a compiler with improved relationship and boundary identification is required that does not inordinately increase compile time. Just such a solution is provided below.

SUMMARY OF THE INVENTION

This invention concerns a method and apparatus for determining the relationships and functional lifetime of objects in a program.

According to the teachings of the present invention, an innovative method for identifying the bounds of an object within a program is presented, the method comprising receiving program code including the object in a suitable language, and analyzing each statement of code according to a set of rules defining an escape analysis with a complexity linear in time and space with the size of the program plus the program's call graph.

The set of rules employed in the analysis transform the received program code into a set of type constraints having a set of properties, the solution of which identifying the relationships and useful lifetime of an object. It will be appreciated that unlike the computationally burdensome analyses that characterize the prior art, the linear nature of the escape analysis disclosed herein facilitates implementation in, for example, a compiler for an advanced programming language. The linear escape analysis can be utilized, for example, to improve stack allocation of objects, reduce unnecessary synchronization of objects, and a host of additional features which will become apparent from the discussion to follow.

DETAILED DESCRIPTION

Example Computer System

For ease of illustration, and not limitation, the present invention will be developed within the context of a compiler implementation. It is to be appreciated that the linear escape analysis disclosed herein may well be used in accordance with alternate implementations without deviating from the spirit and scope of the present invention.

In the discussion herein, the invention is described in the general context of computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, personal digital assistants, multiprocessor systems, microprocessor-based or programmable consumer electronics, network PCs, minicomputers, mainframe computers, and the like. In a distributed computer environment, program modules may be located in both local and remote memory storage devices.

Figure 1:
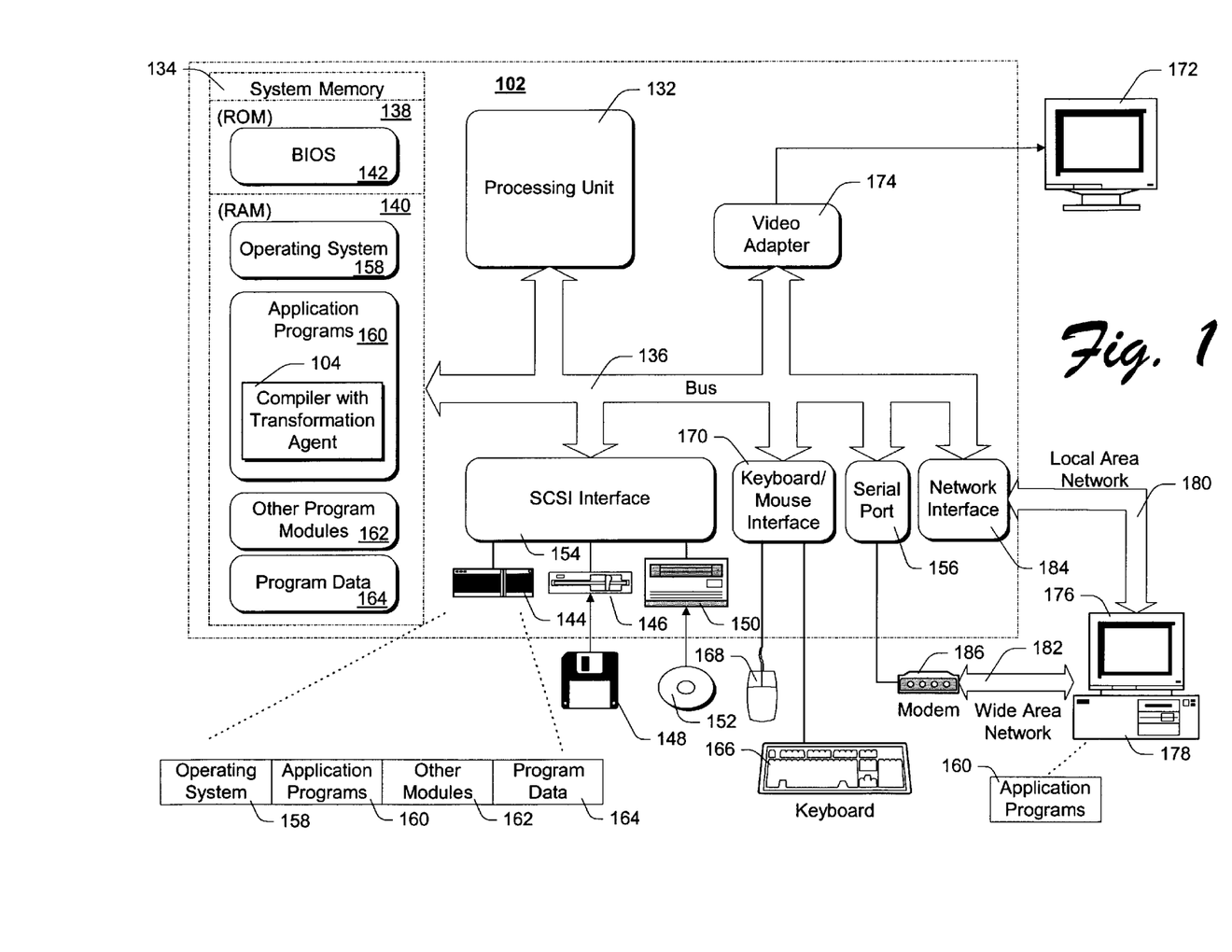
FIG. 1 is a block diagram of an example computer system including a compiler incorporating the teachings of the present invention.

FIG. 1 shows a general example of a computer system 102 incorporating the teachings of the present invention. It will be evident, from the discussion to follow, that computer 102 is intended to represent any of a class of general or special purpose computing platforms which, when endowed with the innovative compiler 104, implement the teachings of the present invention. In this regard, the following description of computer system 102 is intended to be merely illustrative, as computer systems of greater or lesser capability may well be substituted without deviating from the spirit and scope of the present invention.

As shown, computer 102 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 102, such as during start-up, is stored in ROM 138. Computer 102 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media. The hard disk drive 144, magnetic disk drive 146, and optical disk drive 150 are connected to the bus 136 by a SCSI interface 154 or some other suitable bus interface. The drives and their associated computer-readable media provide nonvolatile storage of computer readable instructions, data structures, program modules and other data for computer 102.

Although the exemplary environment described herein employs a hard disk 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the bard disk 144, magnetic disk 148, optical disk 152, ROM 138, or RAM 140, including an operating system 158, one or more application programs 160 including, for example, the innovative compiler 104, other program modules 162, and program data 164. A user may enter commands and information into computer 102 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to bus 136. A monitor 172 or other type of display device is also connected to the bus 136 via an interface, such as a video adapter 174. In addition to the monitor 172, personal computers often include other peripheral output devices (not shown) such as speakers and printers.

As shown, computer 102 operates in a networked environment using logical connections to one or more remote computers, such as a remote computer 176. The remote computer 176 may be another personal computer, a personal digital assistant, a server, a router or other network device, a network "thin-client" PC, a peer device or other common network node, and typically includes many or all of the elements described above relative to computer 102, although only a memory storage device 178 has been illustrated in FIG. 2.

Figure 2:
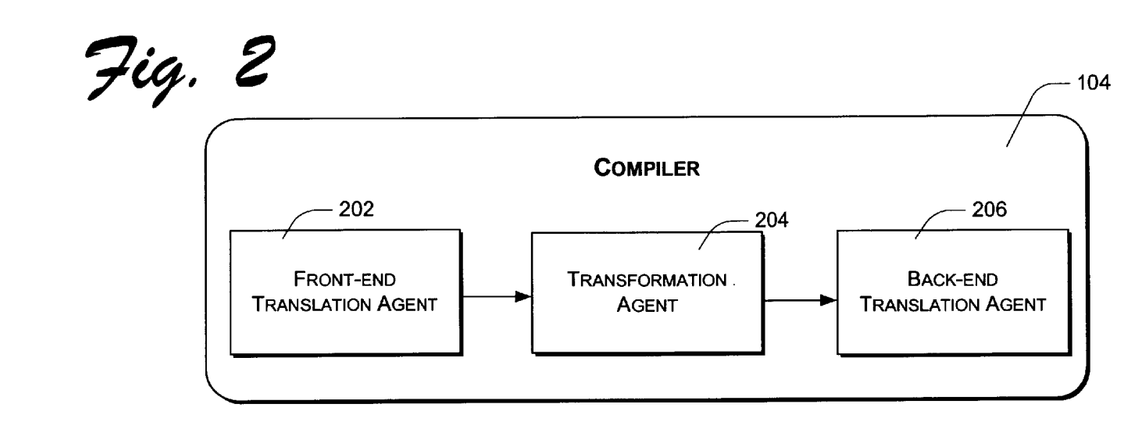
FIG. 2 is a block diagram of an example compiler depicting the linear escape analysis agent of the present invention, according to one embodiment of the invention.

As shown, the logical connections depicted in FIG. 2 include a local area network (LAN) 180 and a wide area network (WAN) 182. Such networking environments are commonplace in offices, enterprise-wide computer networks, Intranets, and the Internet. In one embodiment, remote computer 176 executes an Internet Web browser program such as the "Internet Explorer" Web browser manufactured and distributed by Microsoft Corporation of Redmond, Washington to access and utilize online services.

When used in a LAN networking environment, computer 102 is connected to the local network 180 through a network interface or adapter 184. When used in a WAN networking environment, computer 102 typically includes a modem 186 or other means for establishing communications over the wide area network 182, such as the Internet. The modem 186, which may be internal or external, is typically connected to the bus 136 via a serial port interface 156. In a networked environment, program modules depicted relative to the personal computer 102, or portions thereof, may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Example Compiler with Transformation Agent

FIG. 2 illustrates a block diagram of an example compiler incorporating the teachings of the present invention. As shown, compiler 104 includes a front-end translation agent 202, a transformation agent 204 and a back-end translation agent 206, each coupled as depicted. As described above, the general purpose of any compiler, including compiler 104, is to receive program code written in a high-level program language and to generate code written in another program language, typically machine executable (sometimes referred to as operational, or "op") code in order to execute the program on a computer.

The translation function is typically broken into two separate functional blocks. The front-end translation agent 202 is specific to the particular high-level programming language supported by the compiler. It is designed to translate the high-level language to an intermediate-level language. A common constraint on an intermediate-level language is the static single-assignment (SSA) form. According to the SSA form, each variable has only one definition in the program text. In translating the high-level program language into SSA form, front-end translation agent 202 renames variables such that each variable is assigned a value only in one place throughout a program. The phi ($\phi$) notation is used to denote combination of values where control flow merges, e.g., a loop. The $\phi$ function has the form:

$$v_0 = \phi(c_0, \ldots, c_i) \qquad (1)$$

In accordance with the SSA lexicon, the $\phi$ function automatically chooses a correct variable/value from among its arguments (e.g., $C_0, \ldots, c_i$) based on the control flow path used to reach it. In this way, code denoted in the SSA form eliminates false dependencies. The SSA form is well known to those skilled in the art and, therefore, need not be further described here.

The back-end translation agent 206 is specific to the desired output language, typically dependent upon the processing system that will be executing the program. Accordingly, back-end translation agent 206 includes an op-code library (not shown) and translates the SSA intermediate-level language into op-codes for a particular processing platform to enable the processing platform to execute the program.

Those skilled in the art will appreciate that creating the compiler in accordance with this object-oriented format enables compiler manufacturer's to reuse front-end translation agents and back-end translation agents in a number of different combinations to support a number of different programming language-processing platform combinations. For purposes of this application, for consistency and ease of illustration, further references to high-level programming language will be made to Java language components. It is to be appreciated, however, that the fundamental aspects of the present invention may well be applied to any advanced programming language.

According to one implementation of the present invention, in addition to the translation agents described above, compiler 104 is shown comprising transformation agent 204. As will be developed more fully below, transformation agent 204 receives the intermediate-language representation of the program code and analyzes the code to identify the relationships and functional lifetime (bound) of objects within the code. More particularly, transformation agent 204 utilizes an innovative escape analysis that is linear in time and space with the size of the program plus the program's call graph to identify object relationships and the functional bounds of objects used in the program being compiled. Based, at least in part on the relationships and functional lifetime of objects, transformation agent 204 modifies, supplements, and/or eliminates select sections of the intermediate-language code received from front-end translation agent 202.

The modification to the intermediate-language code by transformation agent 204 facilitates, in addition to other optimizations, stack allocation of select objects, eliminating synchronization support for select objects, facilitates object elimination of select objects and a host of other optimizations based, at least in part, on the identified relationships and functional bounds of analyzed objects. More particularly, the modification of the intermediate-language code by transformation agent 204 is interpreted by back-end translation agent 206, which generates op-codes that include the functional optimizations described above.

It is to be appreciated, based on the discussion above, that except for transformation agent 204, compiler 104 is intended to represent any of a broad category of software compilers known in the art. Indeed, insofar as transformation agent 204 operates to analyze and optimize code at an intermediate-language level, it is anticipated that transformation agent 204 may well be integrated in any of a number of alternate compiler architectures without requiring significant changes of the architecture to accommodate the transformation agent. In addition, although depicted as a separate functional element, those skilled in the art will appreciate that one or more elements of compiler 104 may well be combined without deviating form the spirit and scope of the present invention. That is, the innovative transformation agent 204 may well be integrated with other functional blocks of a compiler or, alternatively, reside as an adjunct element to the compiler.

Figure 3:
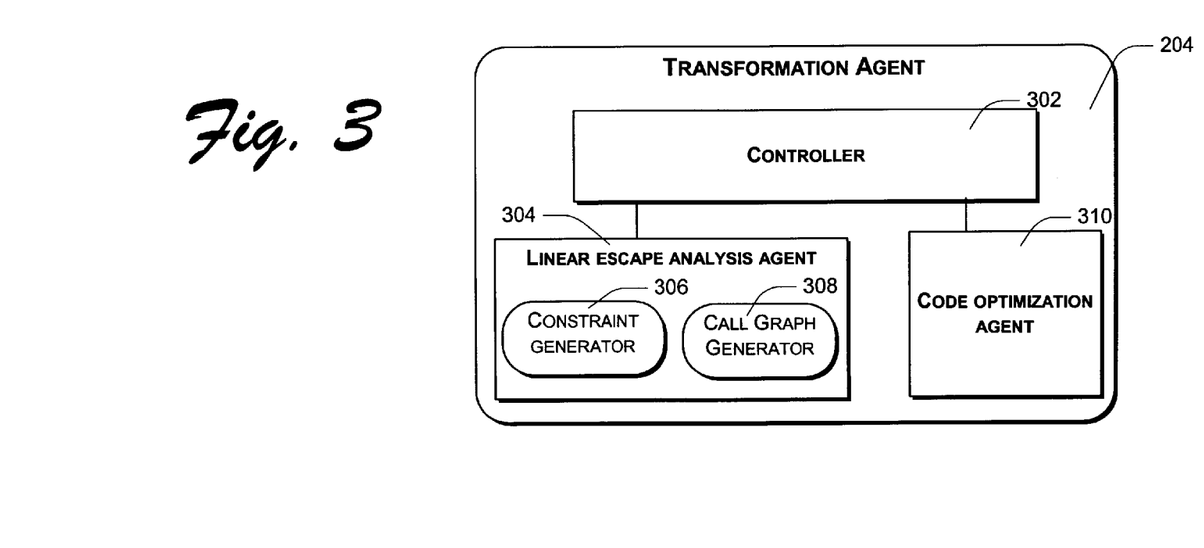
FIG. 3 is a block diagram of an example linear escape analysis agent, according to one embodiment of the invention.

FIG. 3 illustrates a block diagram of an example transformation agent 204 incorporating the teachings of the present invention. As shown, transformation agent 204 is generally comprised of controller 302, linear escape analysis agent 304 having constraint generator function 306 and call graph generator 308, and code optimization agent 310, each coupled as depicted. As described above, the transformation agent 204 receives program code in an intermediate-level compiler language (e.g., SSA), identifies the relationships and lifetimes of objects created within the program, and alters the intermediate-level language to effect certain optimizations described above. Those skilled in the art will appreciate that (Java) objects may be created by instantiating a (Java) class, i.e., explicitly with a "new" command (i.e., v=new c). Controller 302 selectively invokes instances of the above functions to identify the relationships and bounds of objects within the received program code to facilitate code optimizations.

Controller 302 receives the program code in an intermediate-level compiler language, such as the SSA form described above, from front-end translation agent 202. According to the teachings of the present invention, controller 302 invokes an instance of linear escape analysis agent 304 to analyze the received program code. More particularly, linear escape analysis agent 304 performs the innovative escape analysis, to be described more fully below, and provides controller 302 with object relationship and functional bounds information for each object within a program. In alternate embodiments, controller 302 performs a pre-analysis function to identify select objects to subject to the linear escape analysis agent 304. After the escape analysis has been completed, controller 302 invokes an instance of code optimization agent 310 to alter the received intermediate-level language based, at least in part, on the object information received from linear escape analysis agent 304. Except as configured to effect the teachings of the present invention, controller 302 is intended to represent any of a number of alternate control systems known in the art including, but not limited to, a microprocessor, a programmable logic array (PLA), a micro-machine, an application specific integrated circuit (ASIC) and the like. In an alternate implementation, controller 302 is intended to represent a series of executable instructions to implement the logic described above.

As shown, linear escape analysis agent 304 comprises constraint generator 306 and call graph generator 308. As alluded to above, linear escape analysis agent 304 receives intermediate-level language program code from controller 302 and performs an innovative escape analysis with a complexity linear in time and space to the size of the program being compiled and the generated call graph.

In performing the innovative analysis, linear escape analysis agent 304 derives type constraints based, at least in part, on the syntactic structure of the received program, and propagates values through the constraints solving the constraint system in time and space linear in the number of constraints (i.e., size of the program plus the size of the call graph). The objective of the analysis is to keep track of objects created during the execution of a method. The objects may be created directly in the method or in methods called by the method. An object is considered to have escaped from the scope of a method if: (1) a reference to the object is returned from the method, or (2) if a reference to the object is assigned to a field of an object. An object which escapes the scope of a method is considered non-stackable in the method, i.e., cannot be allocated to a frame/method stack. In contrast, all other objects created in the method which are not identified as having escaped are candidates for stack allocation and synchronization optimizations.

To perform the escape analysis, linear escape analysis agent 304 introduces five (5) new properties: escaped, returned, vfresh, mfresh and loop. Linear escape analysis agent 304 tracks these properties for each local variable to determine if an object escapes the scope of a method. Each of the properties will be described in more detail, below.

In performing the escape analysis, constraint generator 306 derives type constraints from the syntactic form of the received intermediate-level language program code. To illustrate the operation of constraint generator 306, constraint derivation will be presented for the representative set of intermediate-level language statements generated from a Java™ language program presented in Table I, below.

TABLE I

Representative Intermediate Level Language Statements

| Domains | Effect Statements | Control Statements |
|---|---|---|
| m $\in$ M = methods | s = v | if v |
| f $\in$ F = fields | v = s | return$_m$ v |
| s $\in$ S = static fields | $v_0 \cdot f = v_1$ | goto |
| $c, c_0, c_1, \ldots \in C$ = classes | $v_0 = v_1 \cdot f$ | throw v |
| $v, v_0, v_1, \ldots \in$ = local variables | $v_0 = v_1$ | |
| | $v_0 = \phi(v_1, \ldots, v_n)$ | |
| | $v_0 = v_1 \cdot m(v_2, \ldots, v_n)$ | |
| | v = new c | |

According to one implementation of the invention, the analysis is flow-insensitive within a method, so only the return and throw control statements are interesting. As shown, the return statement is annotated with the method in which it occurs. The new statement creates an object of the specified class but does not initialize the object apart from filling the memory block with zeroes.

The analysis computes two boolean properties for each local variable, v of reference type. The property escaped(v) is true if the variable holds references that may escape due to assignment statements or a throw statement. The property returned(v) is true if the variable holds references that escape by being returned from the method in which v is defined.

In addition to the escaped and returned properties, above, the vfresh and mfresh properties are introduced to identify variables that contain freshly allocated objects and methods returning freshly allocated objects, respectively. The set of classes (e.g., Java reference types) is augmented with a ⊥ and a ⊤ element to form a flat lattice, τ, with partial order ≦, which may be depicted as:

$$\tau :: \text{(Java Reference Types (classes))} \quad (2)$$

The proper elements of τ are discrete, i.e., the least upper bound of any two distinct proper elements is ⊤. The τ property vfresh(v) is a Java reference type if v contains a freshly allocated object of exactly that type, and is either ⊤ or ⊥, otherwise. vfresh(v) is ⊤ for all formal parameter variables.

The τ property mfresh(m) is a Java reference type if the method m returns a freshly allocated object of exactly that type, and is either ⊤ or ⊥, otherwise.

Each statement of a program may impose constraints on these properties. The constraints imposed by interesting representative intermediate-level language statements are shown in Table II. As shown, the "→" operator denotes boolean implication.

TABLE II

Constraints for escaped, returned, vfresh and mfresh properties

| | |
|---|---|
| $return_m\ v$: | $v_0 = v_1$: |
| true ⇒ returned(v) | escaped($v_0$) ⇒ escaped($v_1$) |
| vfresh(v) ≦ mfresh(m) | returned($v_0$) ⇒ returned($v_1$) |
| escaped(v) ⇒ (⊤ ≦ mfresh(m)) | ⊤ ≦ vfresh($v_0$) |
| throw v: | $v_0 = \phi(v_1, \ldots, v_n)$: |
| true ⇒ escaped(v) | ⊤ ≦ vfresh($v_0$) |
| | ∀i ∈ [1 . . . n]: |
| v = new c: | escaped($v_0$) ⇒ escaped($v_i$) |
| c ≦ vfresh(v) | returned($v_0$) ⇒ returned($v_i$) |
| s = v: | $v_0 = v_1 \cdot m(v_2 \ldots v_n)$: |
| true ⇒ escaped(v) | ∀i ∈ [2 . . . n]:∀g ∈ methods-invoked($v_1 \cdot m$) |
| | let f = formalvar(g,i),c = returned(f) in |
| v = s: | c ⇒ (escaped($v_0$) ⇒ escaped($v_i$)) |
| ⊤ ≦ vfresh(v) | c ⇒ (returned($v_0$) ⇒ returned($v_i$)) |
| | escaped(f) ⇒ escaped($v_i$) |
| $v_0 \cdot f = v_1$: | mfresh(g) ≦ vfresh($v_0$) |
| true ⇒ escaped($v_1$) | |
| $v_0 = v_1 \cdot f$: | |
| ⊤ ≦ vfresh($v_0$) | |

According to one implementation, no attempts are made to track references through assignments to fields, so any reference assigned to a field is assumed to possible be escaped from the method in which the assignment occurs, and is, therefore, non-stackable. In the rule for method invocation, if a reference passed as an argument to a method may be returned from the method than the escaped and returned properties are propagated as if there was an assignment from the actual parameter to the left-hand-side variable of the invocation statement. The function methods-invoked returns a set of methods that may be invoked at the call site as indicated within a given call graph. The function formal-var returns the formal parameter variable indicated by the given method and parameter index.

Most of the constraints derived by linear escape analysis agent 304 are boolean implications, as described above. Accordingly, the minimal solution to these constraints may be found by initializing all properties to be false, and updating the properties as constraints are added. The property values are monotonic, i.e., a true property will always stay true while a false property may turn true as more constraints are added. According to one implementation, when adding a constraint where the trigger is a property whose value is false, a pending list for that property is used to ensure that the constraint is processed again should the property value become true. Similarly, pending lists can be used to re-process ≦ constraints when the left-hand element changes value. As described above, insofar as the constraints are based on a lattice height of three (3) (e.g., ⊥, Java reference type, or ⊤, respectively). Thus, according to one implementation, each constraint can only be processed three times, at most. It follows that a minimal solution to the set of type constraints derived by constraint generator 306 can be found in time and space linear to the number of constraints generated.

According to one implementation, objects created in a loop can only be stack allocated if objects from different loop iterations have non-overlapping lifetimes so the used memory area can be reused in subsequent iterations of the loop. A property is introduced to identify when stack allocation is impossible due to overlapping lifetimes. The boolean property loop(v) is true if the local variable v is modified in a loop and objects referenced in different iterations of the loop have overlapping lifetimes. The property is only interesting for variables containing references to variable that do not otherwise escape (and thus are already ineligible for stack allocation). Given a method in SSA form, objects created by a given new statement in a given method execution can only have mutually overlapping lifetimes if an object may escape or if a reference to an object is stored in a local variable used as an argument to a phi (φ) expression at a loop header. Table III, below shows the constraints on the loop property imposed by interesting representative intermediate-level language statements.

$v_0 = v_l$: $loop(v_0) \Rightarrow loop(v_l)$ $v_0 = $ $v_l \cdot m(v_2 \ldots v_n)$: ∀ $i \in [2 \ldots n]$: ∀ $i \in$ methods-invoked($v_l \cdot m$): let $f = $ formalvar($g, i$), $c = $ returned($f$) in $c \Rightarrow (loop(v_0) \Rightarrow loop(v_i))$ $v_0 = \phi(v_l \ldots v_n)$: ∀ $i \in [1 \ldots n]$: true ⇒ $loop(v_i)$ Thus, for each statement of the form v=new c, any object created has a lifetime bounded by the lifetime of the method and the object has non-overlapping lifetimes with other objects created by the statement if escaped(v), returned(v) and loop(v) (as defined above) are each false. In this case, the object assigned to v is stack allocable.

Controller 302 invokes an instance of call graph generator 308 to analyze the relationships between objects of a received program. As discussed above, the number of constraints generated from the program is linear in the size of the program plus the size of the call graph. Call graph generator 308 creates associations between method invocation statements and the methods potentially invoked by that statement. The call graph is represented by the "methods-invoked" function. According to one implementation, the size of the call graph is measured the number of caller-callee pairs plus the length of each pair's argument lists.

Once linear escape analysis agent 304 has completed the escape analysis of the compiling program, controller 302 invokes code optimization agent 310 to selectively transform the intermediate-level language code. According to one embodiment of the present invention three (3) optimizations may be made: (1) stack allocate stackable objects; (2) selectively explode objects; and (3) synchronization elimination.

As described above, objects for which the escaped and returned properties are false are stackable. That is, linear escape analysis agent 304 has determined that such objects are only utilized by the program during the invocation of a particular method and, thus, may be allocated to the stack of the method. In such an instance, code optimization agent 310 replaces the "new" operator (creating the object) with an innovative "newStack" operator. The newStack operator denotes to the back-end translation agent 206 that the object is to be allocated to the runtime stack, rather than the heap.

Methods that return a freshly created object (as defined above) may be specialized to instead take a freshly created object as an extra argument. The freshly created object may be created on the stack at those call sites where the object originally returned does not escape. At the remaining call sites, the freshly created object may be created on the heap. The Java virtual machine semantics dictate that any freshly allocated block of memory be filled with zeroes. A block of memory allocated in a stack can be filled with zeroes at allocation time. If a pointer to such a memory block is passed as an extra argument to a specialized method, then the memory block is only known to be filled with zeroes the first time it is used. To ensure that the memory block is only used once, a depth-first traversal is performed of each method m for which mfresh(m) is a proper element, ensuring that for each return variable v, the following holds:

(1) there is no path in m from the definition v back to itself, i.e., the definition of v does not occur in a loop in m; and (2) all paths in m from the definition of v terminate with a statement return(v)

Each of these conditions on paths in m is computed in a depth-first traversal of the control-flow graph of m. If either condition is not satisfied, the following constraint is added:

$$\top \leq m\text{fresh}(m) \quad (3)$$

For each method m for which mfresh(m) is a proper element, a specialized version, m' of the method is created with an extra formal parameter, which we for presentation purposes name "site". For each variable v in method m for which vfresh(v) and returned(v) are both true (i.e., loop(v) and escaped(v) are both false), the body of method m is transformed by code optimization agent 310 as follows:

(1) if the definition of v is a statement of the form v=new c, eliminate it.

(2) if the definition of v is a statement of the form v=h($v_1$, ..., $v_n$), transform the statement to be h' ($v_1$, ..., $v_n$, site), where h' is method which behaves exactly as h except that the new object is passed to h' as an argument (site) rather than being obtained from the heap. Formally, h' has an extra argument site and a "void" result type (3) substitute all uses of v with uses of site.

(4) replace all return(v) statements with return ( ) statements.

As described above, stack allocation may be performed on all methods of the program in an arbitrary order.

In addition to stack allocation, code optimization agent 310 may replace an object by a set of local variables representing the fields of the object—an optimization colloquially referred to as "object reduction". According to one implementation, a stackable object defined as v=newStack T may be replaced with local variables if it is possible to inline all methods that take v as an argument and if, after inlining, all uses of v are only to read and write fields of v. One example candidate for object reduction are Java objects of type java.util.Enumeration, typically used to loop through data structures. Such objects are typically stack allocable because each object is only used in a single context to step through the elements of the enumeration, which in turn typically only involves accessing the fields of the object. It is to be appreciated that object reduction is a tradeoff between code growth and object elimination. Object reduction is usually advantageous for iterator objects such as the Enumeration object described above.

Although described as separate functional elements, it is to be appreciated that one or more of controller 302, linear escape analysis agent 304 and code optimization agent 310 may be integrated into a single functional element. Moreover, it is to be appreciated that linear escape analysis agent 304 and code optimization agent 310 may well be implemented in hardware or a series of executable instructions which, when executed, implement the innovative functions described above.

Example Operation and Implementations

Figure 4:
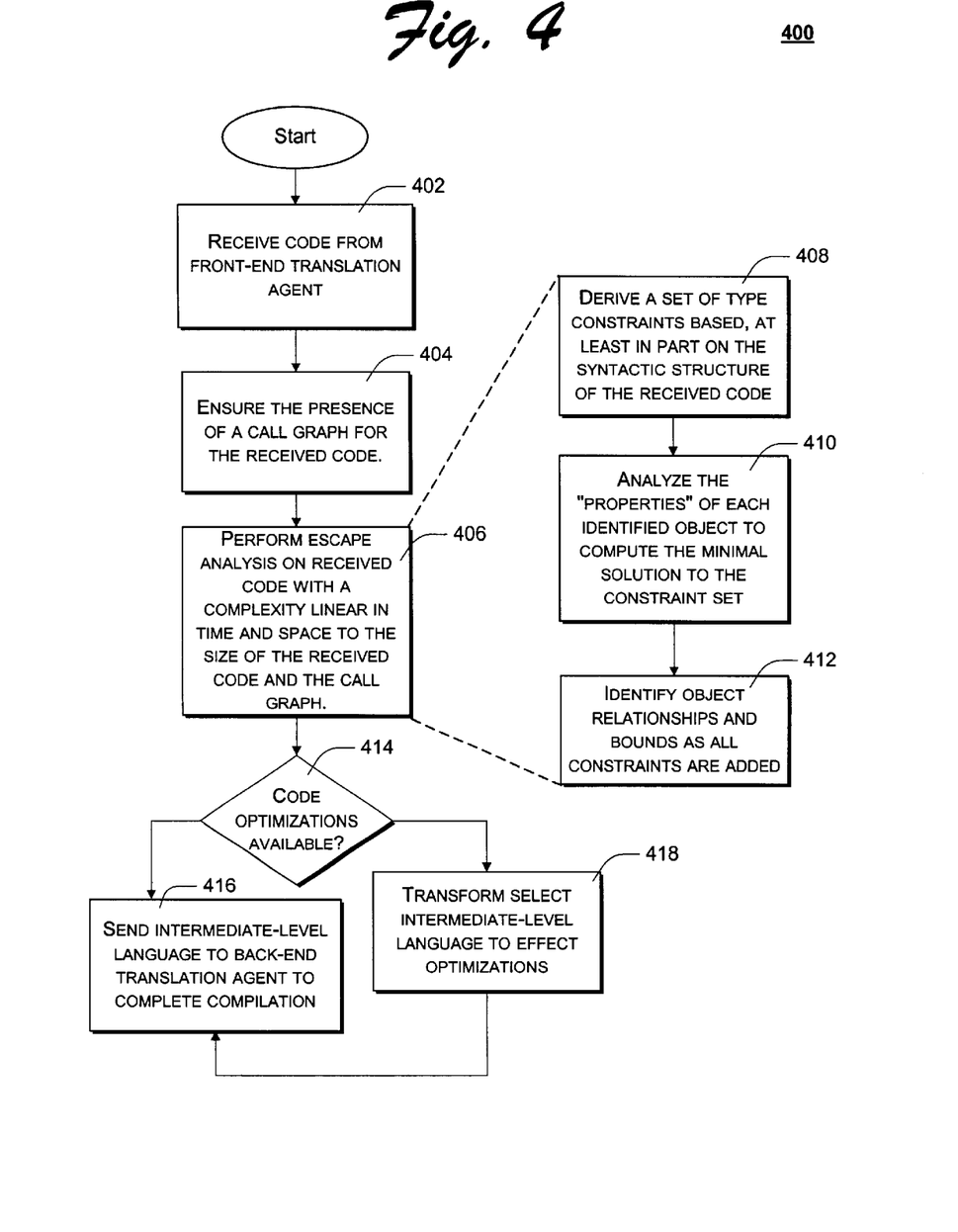
FIG. 4 is a flow chart illustrating the method steps for performing linear escape analysis in accordance with the teachings of the present invention.

FIG. 4 is a flow chart of an example method for identifying the relationships and functional bounds of a program object, according to one embodiment of the present invention. For ease of explanation, and not limitation, the method of FIG. 4 will be developed with continued reference to FIGS. 1–3.

Turning to FIG. 4, the method begins with step 402 wherein transformation agent 204 receives code from the front-end translation agent 202. As described above, front-end translation agent 202 provides controller 302 of transformation agent 204 with compiled code in an intermediate-level language, such as SSA. Controller 302 invokes an instance of the linear escape analysis agent 304. Once invoked by controller 302, linear escape analysis agent 304 in step 404 ensures the presence of call graph information for the received code. In the absence of pre-existing call graph information, the controller 302 invokes an instance of the call graph generator function 308 to assemble the call graph. As described above, call graph generator function 308 associates a call site within the received code with a set of possibly invoked methods.

In step 406, linear escape analysis agent 304 performs an innovative escape analysis on the received code with a complexity linear in time and space to the size of the received code plus the program's call graph. To perform the innovative linear escape analysis, linear escape analysis function 304 invokes constraint generator 306 to derive a set of type constraints based, at least in part, on the syntactic structure of the received code, step 408. Linear escape analysis agent 304 computes the minimal solution (step 410) to the constraint set generated in step 408. That is, linear escape analysis agent 304 computes appropriate values of the escaped, returned, mfresh, vfresh and loop properties for each local variable in the received code. It is to be appreciated that the solution to the constraint set can be computed both as a stand-alone step (410) or as the constraints are generated from the received code (i.e., combined with step 408).

In step 412, linear escape analysis agent 304 completes the linear escape analysis once all of the type constraints have been solved, identifying object relationships and bounds.

Once the innovative escape analysis has been completed, controller 302 determines whether any code optimizations resulting from the innovative linear escape analysis are possible, step 414. If controller 302 determines that further code optimization is not possible, or warranted, the received intermediate-level language code is sent to the back-end translation agent 206, which translates the intermediate-level language code to the target program language, thereby completing the compilation process.

If, however, in step 414 controller 302 determines that further code optimizations are possible and warranted, controller 302 invokes an instance of code optimization agent 310 to transform select portions of the received intermediate-level language code in response to the identified relationships and bounds of objects, step 418. Once code optimization agent 310 has completed the code optimization process, in step 416 the altered intermediate-level language code is sent to the back-end translation agent 206 to translate the optimized intermediate-level language code into the target program language, thereby completing the compilation process.

Figure 5:
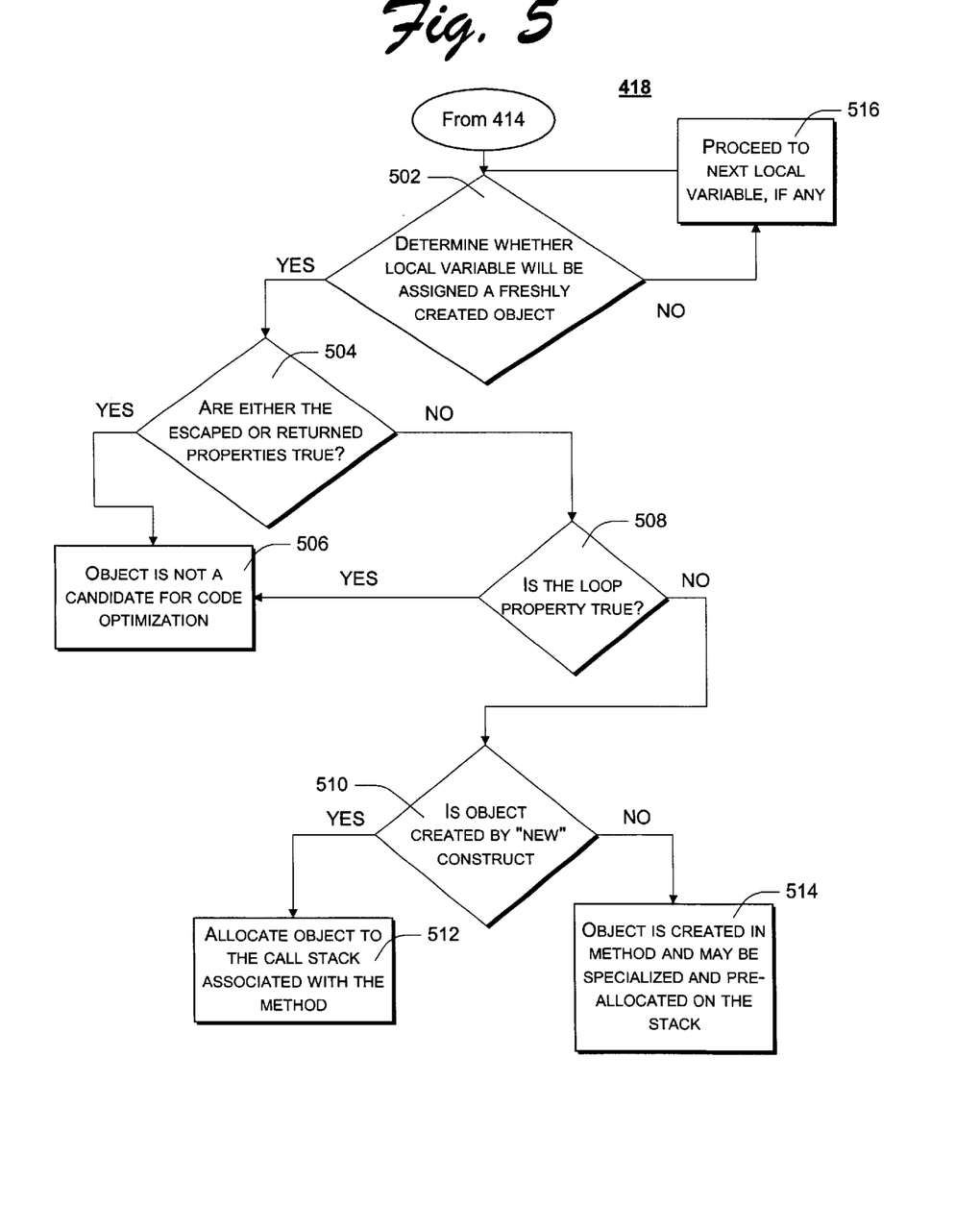
FIG. 5 is a flow chart illustrating the method steps for stack allocating objects during program compile, according to one aspect of the present invention.

Turning to FIG. 5, a flow chart illustrating the method steps for performing one or more code optimizations is presented, according to one embodiment of the present invention. The steps are repeated for each local variable in the received program. As shown, the method begins with step 502, wherein optimization function 310 determines whether the local variable will be assigned a freshly created object. If not, the process proceeds to the next local variable, if any, step 516. If, however, a local variable will be assigned a freshly created object, a further determination is made as to whether the escaped or returned properties are true, step 504. If either of the escaped or returned properties are true, the object is not a candidate for further code optimization and the process continues with the next local variable, step 506.

If, however, it is determined in step 504 that neither the escaped or returned properties are true, i.e., both of these boolean properties are false, a further determination is made as to whether the loop property is true, step 508. If, in step 508, it is determined that the loop property is true the object is not a candidate for further code optimization according to one implementation, and the process continues with the next local variable, step 506.

If, however, the loop property is not true then a further determination is made whether the object is created in the present method by a statement of the form "v=new c", step 510. If so, the object is allocated to the stack associated with the method, step 512.

If, in step 510 the object is not created by the new construct, it is created in a method called by a statement of the form "$v_0 = v_1.m(v_2 \ldots v_n)$". If the object is created in a method called by a statement of the form "$v_0 = v_1.m(v_2 \ldots v_n)$", the called method or methods may be specialized as described above, and the object may instead be pre-allocated on the stack and the method invocation statement may be changed to pass the pre-allocated object as an extra argument to the specialized method, step 514. It will be appreciated that by allocating the object to the stack, the runtime overhead associated with garbage collection of such an object is reduced. Thus, although stack allocation does not necessarily eliminate code, this technique of stack allocating objects is still considered a code optimization.

Figure 6:
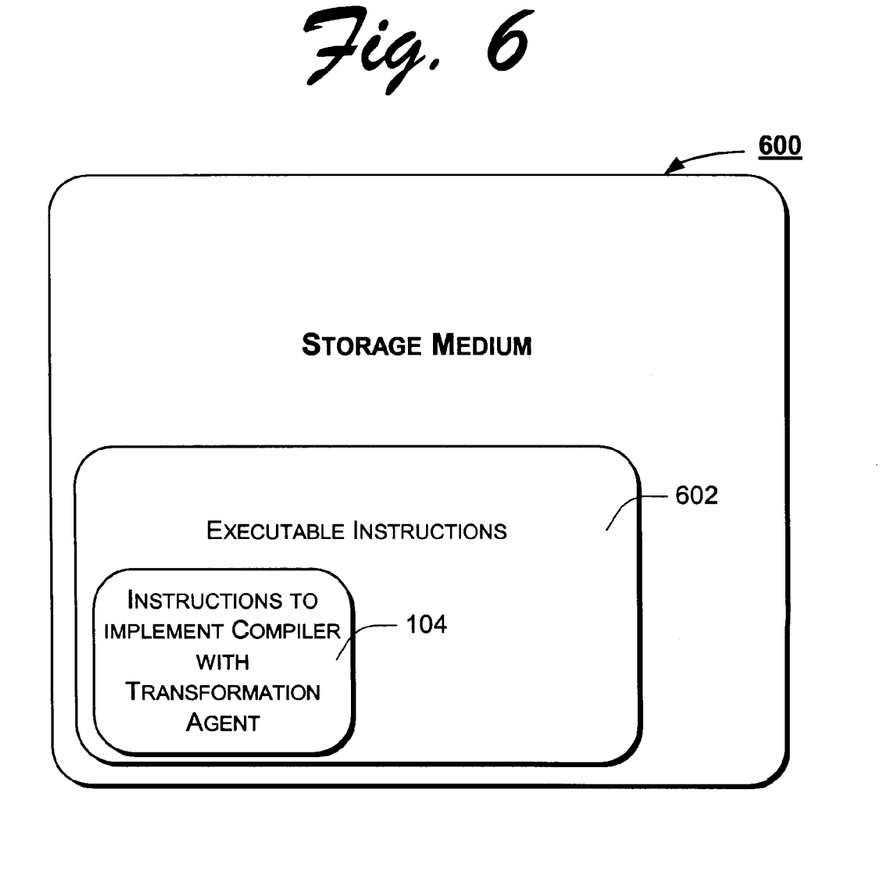
FIG. 6 is a block diagram of a storage medium having stored thereon a plurality of instructions which, when executed, implement the linear escape analysis agent of the present invention.

FIG. 6 is a block diagram of a storage medium having stored thereon a plurality of instructions including instructions to implement the teachings of the present invention, according to yet another embodiment of the present invention. In general, FIG. 7 illustrates a storage medium/device 600 having stored thereon a plurality of instructions including at least a subset of which that, when executed, implement the compiler 104 with innovative transformation agent 204 of the present invention. When executed by a processor of a host system, the executable instructions implementing transformation agent 204 perform an escape analysis of identified objects of a program that is linear in time and space with the size of the program being compiled plus the program's call graph. Based on the results of the innovative escape analysis, transformation agent 204 may perform code optimization on one or more of the identified objects, thereby improving memory management and runtime execution of the compiled program.

As used herein, storage medium 600 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C, C++, Visual Basic, Java, Smalltalk, Lisp, eXtensible Markup Language (XML), and the like. Moreover, it is to be appreciated that the storage medium/device 700 need not be co-located with any host system. That is, storage medium/device 700 may well reside within a remote server communicatively coupled to and accessible by an executing system. Accordingly, the software implementation of FIG. 7 is to be regarded as illustrative, as alternate storage media and software embodiments are anticipated within the spirit and scope of the present invention.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for determining object bounds for objects within a program, the method comprising:
   receiving the program code in a suitable language; and
   analyzing the received code with a set of rules defining an escape analysis with a complexity linear in time and space with the size of the program plus the program's call graph.

2. A method according to claim 1, wherein the step of analyzing comprises:
   deriving a set of type constraints for each statement based, at least in part, on statement structure; and
   computing a solution to the constraints to determine object relationships and bounds.

3. A method according to claim 2, further comprising:
   summarizing object relationships and bounds.

4. A method according to claim 2, wherein the step of deriving constraints comprises:
   deriving a first set of constraints for a first subset of the received code based, at least in part, on statement structure of the first subset of code; and
   deriving a second set of constraints for a second subset of the received code based, at least in part, on statement structure of the second subset of code.

5. A method according to claim 1, wherein the suitable language is an intermediate-level language.

6. A method according to claim 5, wherein the intermediate-level language is in static single-assignment form.

7. A method according to claim 5, wherein the intermediate-level language is in a form that delineates between subsequent definitions of local variables, uniquely identifying each local variable.

8. A method according to claim 1, further comprising transforming the received program code based on the results of the escape analysis.

9. A method according to claim 8, wherein the step of transforming comprises:
stack allocating objects identified by the escape analysis to not possess an escaped or returned property.

10. A method according to claim 8, wherein the step of transforming comprises:
stack allocating objects identified by the escape analysis to not possess an escaped, returned, or loop property.

11. A method according to claim 9, wherein the step of transforming further comprises:
eliminating any synchronization support for objects which can be stack allocated.

12. A method according to claim 8, wherein the step of transforming comprises:
performing object reduction on objects in a method.

13. A method according to claim 12, wherein object reduction comprises:
eliminating the object from the method; and
modifying the method to pass elements of the eliminated object as arguments to the method.

14. A storage medium comprising a plurality of executable instructions including instructions which, when executed, implement the method of claim 1.

15. A compiler comprising:
a translation agent to translate program code from a first language to a second language; and
a transformation agent, coupled to the translation agent, to receive the translated program code in the second language and analyze the code to identify object bounds for objects within the program code using an escape analysis that is linear in time and space with the received program code.

16. A compiler according to claim 15, wherein the transformation agent derives a set of type constraints to generate a constraint system representing the program, and solves the constraint system in time and space linear in the number of constraints.

17. A compiler according to claim 15, the transformation agent comprising:
an escape analysis agent, to receive the code and perform the escape analysis with a complexity linear in time and space to the received code to identify object relationships and bounds; and
an optimization agent, to transform the received code in the second language based on the identified object relationships and bounds.

18. A compiler according to claim 17, wherein the optimization agent allocates objects identified by the escape analysis to not possess an escaped or returned property to a stack memory.

19. A compiler according to claim 17, wherein the optimization agent allocates objects identified by the escape analysis to not possess an escaped, returned, or loop property to a stack memory.

20. A compiler according to claim 18, wherein the optimization agent eliminates synchronization support for objects which can be stack allocated.

21. A compiler according to claim 17, wherein the optimization agent allocates objects to a stack memory when the object is identified by the analysis to not extend beyond a lifetime of the stack memory, and does not exhibit overlapping lifetimes.

22. A compiler according to claim 17, wherein the optimization agent modifies methods within the program code identified by the escape analysis to possess a proper mfresh property and to include an object that possesses a proper vfresh property and the returned property.

23. A compiler according to claim 22, wherein the modification comprises adding a extra method argument and using the added method argument in place of the identified object.

24. A compiler according to claim 22, wherein the modification comprises object reduction, wherein the identified object is eliminated and its elements are passed as arguments to the method.

25. A compiler according to claim 16, wherein analysis of the constraint system is flow insensitive.

26. A compiler according to claim 15, wherein the compiler is a Java™ compiler.

27. A storage medium comprising a plurality of executable instructions which, when executed, implement the compiler of claim 15.

28. A method for identifying object bounds for objects in a program, the method comprising:
deriving type constraints for the objects based, at least in part, on one or more program statements defining the object, wherein the number of constraints derived is linear in time and space with the size of the program plus the size of the program's call graph; and
computing a solution to the constraints wherein partial solutions can be computed before all constraints are derived.

29. A method according to claim 28, further comprising:
identifying objects which are bounded by a lifetime of a stack memory; and
allocating objects to the stack identified as being bounded by the lifetime of the stack memory.

30. A method according to claim 29, further comprising:
eliminating runtime synchronization support for objects that can be allocated to the stack memory.

31. A method according to claim 28, further comprising:
identifying objects possessing a proper vfresh property and the returned property within methods of the program possessing a proper mfres property; and
eliminating construction of the identified objects.

32. A method according to claim 31 further comprising:
modifying the methods to pass a reference to the identified object as an argument to the methods.

33. A method according to claim 31, further comprising:
modifying the methods to pass elements of the identified objects as arguments to the methods.

34. A transformation agent comprising an analysis function to receive program code in a suitable language and perform an escape analysis on the received code that is linear in time and space with the size of the received program code plus the program's call graph.

35. A transformation agent according to claim 34, wherein the analysis function derives a system of type constraints representing identified objects within the code based, at least in part, on the syntactic structure of the code and propagates values to solve the system.

36. A transformation agent according to claim 35, wherein the values represent one or more of an escaped, returned, loop, mfresh and vfresh property for each local variable in the received code.

37. A transformation agent according to claim 36, further comprising an optimization function to modify the received program code based on the escape analysis results.

38. A transformation agent according to claim 34, further comprising an optimization function to modify the received code based on the escape analysis results.

39. A transformation agent according to claim 38, wherein the optimization agent modifies the received code by allocating one or more objects to a stack memory.

40. A transformation agent according to claim 39, wherein the optimization agent removes runtime synchronization support from one or more objects that can be allocated to the stack memory.

41. A transformation agent according to claim 38, wherein the optimization agent completely eliminates one or more objects within a method of the program based on the escape analysis results.

42. A storage medium comprising a plurality of executable instructions which, when executed, implement the transformation agent of claim 34.

* * * * *

UNITED STATES PATENT AND TRADEMARK OFFICE
CERTIFICATE OF CORRECTION

PATENT NO. : 6,681,385 B1
DATED : January 20, 2004
INVENTOR(S) : Steensgaard et al.

It is certified that error appears in the above-identified patent and that said Letters Patent is hereby corrected as shown below:

Column 1,
Line 30, "Java$^{TM}$" with -- Java$^{®}$ --.

Column 4,
Line 44, replace "bard" with -- hard --.

Column 16,
Line 48, replace "mfres" with -- mfresh --.

Signed and Sealed this

Third Day of August, 2004

JON W. DUDAS
*Acting Director of the United States Patent and Trademark Office*